US012603097B2

United States Patent

Saifee et al.

(10) Patent No.: US 12,603,097 B2

(45) Date of Patent: Apr. 14, 2026

(54) DYNAMIC SELECTION OF APPROPRIATE FAR-FIELD SIGNAL SEPARATION ALGORITHMS

(71) Applicant: Avago Technologies International Sales Pte. Limited, Singapore (SG)

(72) Inventors: Qutubuddin Saifee, Bangalore (IN); Raghuram Annadana, Bangalore (IN); Sunil Kashinath Shripad, Bangalore (IN); Manoj Singhal, Bangalore (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 453 days.

(21) Appl. No.: 18/102,637

(22) Filed: Jan. 27, 2023

(65) Prior Publication Data

US 2024/0257825 A1 Aug. 1, 2024

(51) Int. Cl.

*G10L 21/02* (2013.01)
*G10L 21/0264* (2013.01)
*G10L 21/0308* (2013.01)
*G10L 21/0208* (2013.01)

(Continued)

(52) U.S. Cl.

CPC ...... *G10L 21/0308* (2013.01); *G10L 21/0264* (2013.01); *G10L 21/02* (2013.01); *G10L 2021/02087* (2013.01); *G10L 2021/02166* (2013.01); *G10L 21/028* (2013.01)

(58) Field of Classification Search

CPC ................... G10L 21/02; G10L 21/028; G10L 2021/02166

See application file for complete search history.

(56) References Cited

U.S. PATENT DOCUMENTS

2009/0067642 A1* 3/2009 Buck ...................... H04R 3/005 381/94.1
2009/0190774 A1* 7/2009 Wang .................... G10L 21/028 381/92
2017/0352362 A1 12/2017 Lee et al.

FOREIGN PATENT DOCUMENTS

CN 112185408 A 1/2021
KR 100990200 B1 * 10/2010
WO WO-2019-229199 A1 12/2019

OTHER PUBLICATIONS

Extended European Search Report, EP App. No. 24152014.7, May 22, 2024.

(Continued)

*Primary Examiner* — Feng-Tzer Tzeng

(74) *Attorney, Agent, or Firm* — King Intellectual Asset Management

(57) ABSTRACT

An exemplary implementation includes a non-transitory computer-readable medium storing instructions that, when executed by a processor, cause the processor to perform operations including receiving a first audio data, processing the first audio data by a first signal separation algorithm, in response to an output of the first signal separation algorithm satisfying at least one parameter, outputting the processed first audio data. In response to the output of the first signal separation algorithm not satisfying the at least one parameter selecting a second signal separation algorithm, which is different than the first signal separation algorithm, receiving a second audio data subsequent in time to receiving the first audio data, processing the second audio data by the second signal separation algorithm, and outputting the processed second audio data.

20 Claims, 7 Drawing Sheets

(51) Int. Cl.
*G10L 21/0216* (2013.01)
*G10L 21/028* (2013.01)

(56) References Cited

OTHER PUBLICATIONS

R. H. Lambert, "A New Method for Source Separation," 1995 International Conference on Acoustics, Speech, and Signal Processing, Detroit, MI, USA, pp. 2116-2119 vol. 3, May 9, 1995.

AudioSmart Voice and Speech Processing, Synaptics, Nov. 8, 2017 [retrieved on Mar. 22, 2024]. Retrieved from the Internet <https://www.synaptics.com/sites/default/files/audiosmart-voice-speech-processing.pdf>.

Beckmann, P. et al., Advancing Always-On Voice Command Systems with Ultra-Low Power Solutions, Jun. 18, 2020 [retrieved on 2024-03-33]. Retrieved from the Internet <https://dspconcepts.com/sites/default/files/voice_ui_part2.pdf>.

Designing Optimized Microphone Beamformers, DSP Concepts, Feb. 5, 2019 [retrieved on Mar. 22, 2024]. Retrieved from the Internet <https://dspconcepts.com/sites/default/files/advancing_always-on_voice_command_systems_white_paper_a-mcuap0-wpga01en_v1.1-1.pdf>.

Optimizing Siri on HomePod in Far-Field Settings—Apple Machine Learning Research, Dec. 2018 [retrieved on Mar. 22, 2024]. Retrieved from the Internet <https://machinelearning.apple.com/research/optimizing-siri-on-homepod-in-far-field-settings>.

Saruwatari, H., Kurita, S., Takeda, K. et al. Blind Source Separation Combining Independent Component Analysis and Beamforming. EURASIP J. Adv. Signal Process. 2003, 569270 (2003).

EP Application No. 24152014.7, Office Action dated Nov. 4, 2025, 8 pages.

* cited by examiner

DYNAMIC SELECTION OF APPROPRIATE FAR-FIELD SIGNAL SEPARATION ALGORITHMS

TECHNICAL FIELD

Exemplary embodiments of this disclosure may relate generally to systems, integrated circuits, and non-transitory computer-readable media for far-field voice processing and, more particularly, to dynamic selection of appropriate far-field signal separation algorithms.

BACKGROUND

Enabling automatic speech recognition (ASR), voice/video calling, and other speech-based activities in real-world scenarios often involves handling scenarios where the user is far from the device and voice commands are spoken in environments ranging from relatively silent to noisy environments (e.g., with music or other people talking in the background). Background sounds can interfere with the identifying speech and degrade the performance of speech-based activities. Far-Field Voice (FFV) systems are designed to improve speech-based activities in such real-world scenarios by reducing the impact of interfering sounds and enhancing the voice of the intended source audio.

BRIEF DESCRIPTION OF THE DISCLOSURE

An exemplary implementation includes a non-transitory computer-readable medium storing instructions that, when executed by a processor, cause the processor to perform operations including receiving a first audio data, processing the first audio data by a first signal separation algorithm, in response to an output of the first signal separation algorithm satisfying at least one parameter, outputting the processed first audio data. In response to the output of the first signal separation algorithm not satisfying the at least one parameter selecting a second signal separation algorithm, which is different than the first signal separation algorithm, receiving a second audio data subsequent in time to receiving the first audio data, processing the second audio data by the second signal separation algorithm, and outputting the processed second audio data.

Another exemplary implementation includes a system that includes a controller. The controller may be configured to perform operations including receiving a first audio data, processing the first audio data by a first signal separation algorithm, in response to an output of the first signal separation algorithm satisfying at least one parameter, outputting the processed first audio data. In response to the output of the first signal separation algorithm not satisfying the at least one parameter selecting a second signal separation algorithm, which is different than the first signal separation algorithm, receiving a second audio data subsequent in time to receiving the first audio data, processing the second audio data by the second signal separation algorithm, and outputting the processed second audio data.

Yet another exemplary implementation includes an integrated circuit including a signal separation module. The signal separation module may be configured to perform operations including receiving a first audio data, processing the first audio data by a first signal separation algorithm, in response to an output of the first signal separation algorithm satisfying at least one parameter, outputting the processed first audio data. In response to the output of the first signal separation algorithm not satisfying the at least one parameter selecting a second signal separation algorithm, which is different than the first signal separation algorithm, receiving a second audio data subsequent in time to receiving the first audio data, processing the second audio data by the second signal separation algorithm, during the processing of the second audio data, transitioning from the first signal separation algorithm to the second signal separation algorithm in response to selecting the second signal separation algorithm, and outputting the processed second audio data.

BRIEF DESCRIPTION OF THE DRAWINGS

Certain features of the subject technology are set forth in the appended claims. However, for purpose of explanation, several example implementations of the subject technology are set forth in the following figures.

Figure 1:
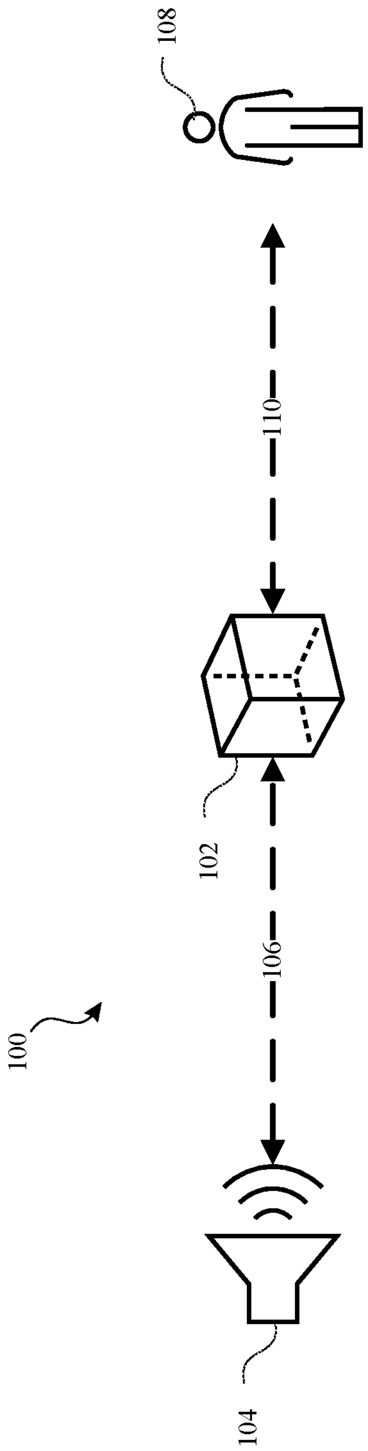
FIG. 1 illustrates an exemplary network configuration of a voice control device, in accordance with one or more exemplary implementations.

The figures depict various implementations for purposes of illustration only. One skilled in the art will readily recognize from the following discussion that alternative implementations of the structures and methods illustrated herein may be employed without departing from the principles described herein.

Not all depicted components may be used in all implementations, however, and one or more implementations may include additional or different components than those shown in the figures. Variations in the arrangement and type of the components may be made without departing from the spirit or scope of the claims as set forth herein. Additional components, different components, or fewer components may be provided.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

FFV processes are designed to improve speech-based activities (e.g., ASR and voice/video calls) in real-world scenarios by reducing the impact of interfering sounds and enhancing the intended source audio (e.g., a user's voice). One step in the FFV process is the separation of audio data into streams of individual audio sources. An audio data may include data captured by one or more microphones. A stream may include a portion of the audio data, which may be a portion of the audio data attributed to a particular audio source. An audio source may be someone or something that generates sound, such as a voice, an instrument, and the like. An audio source may be positioned in a direction (e.g., an angle) relative to the microphone that captures the audio data. An angular distance may be the difference between source directions.

Multiple types of signal separation algorithms may be used to separate audio data into individual audio sources, including beamforming algorithms (BF algorithms) and blind source separation algorithms (BSS algorithms). BF algorithms estimate audio sources (e.g., individuals speaking) from audio data based on a time delay in the signal of an audio source. Example BF algorithms include delay-and-sum beamforming, linear constraint minimal variance, and minimum variance distortionless response. BSS algorithms estimate audio sources based on their prominence, Gaussianness, and/or statistical independence in the output channel (e.g., audio data captured from each microphone). Example BSS algorithms include infomax, fixed-point, and fastICA.

For a target voice in a relatively silent environment (e.g., single target source with no interfering source), BF may be a simpler solution that generally performs better than BSS. For a target voice in a relatively noisy environment (e.g., single target source along with interfering sources), BSS may outperform BF. BSS has a problem of output stream permutation (e.g., output stream to source signal mapping can change dynamically), which tends to be more pronounced in the silent environment scenario and may result in its slightly lower performance than BF in silent environments. Both BF and BSS algorithms are computationally intensive algorithms. While keeping them active in parallel can result in the best performance in silent and noisy environments, doing so would require high usage of computational resources.

The subject technology dynamically selects the optimal signal separation algorithm with the best performance for the device's environment and reduces usage of computational resources when compared to running BF and BSS algorithms in parallel.

FIG. 1 illustrates an exemplary configuration 100 of a voice control device 102, in accordance with one or more exemplary implementations. A voice control device 102 may be a computer device (e.g., a set-top box, a voice assistant device, etc.) for receiving audio data that may contain voice data (e.g., a voice data 110 of a user 108). The audio data may be near- or far-field audio, where near-field audio may be in proximity to the voice control device 102 (e.g., within 10 feet), and far-field audio may be distant from the voice control device 102 (e.g., beyond 10 feet). The voice data 110 may include a process performed by the voice control device 102, such as searching for a query, setting a timer, playing music, etc. The environment 104 in which the user provides a voice data 110 to the voice control device 102 may include noise data 106, such as music, conversations, and any other ambient sounds.

The voice control device 102 receives audio data, which may include the voice data 110 from the user 108 and/or noise data 106 from the environment 104. The voice control device 102 may process the audio to distinguish the voice data 110 from the noise data 106 (e.g., background music, ambient sounds, and the like). Distinguishing the voice data 110 may include enhancing, amplifying, extracting, etc., via various signal separation algorithms. The voice control device 102 may transition between the various signal separation algorithms based on factors including the level of noise, the type of noise, the number of voices, etc. The output of the processing may include one or more sources from the audio data, one or more of which may contain voice data 110 for speech recognition, command identification, etc., which may be performed locally or remotely.

Figure 2:
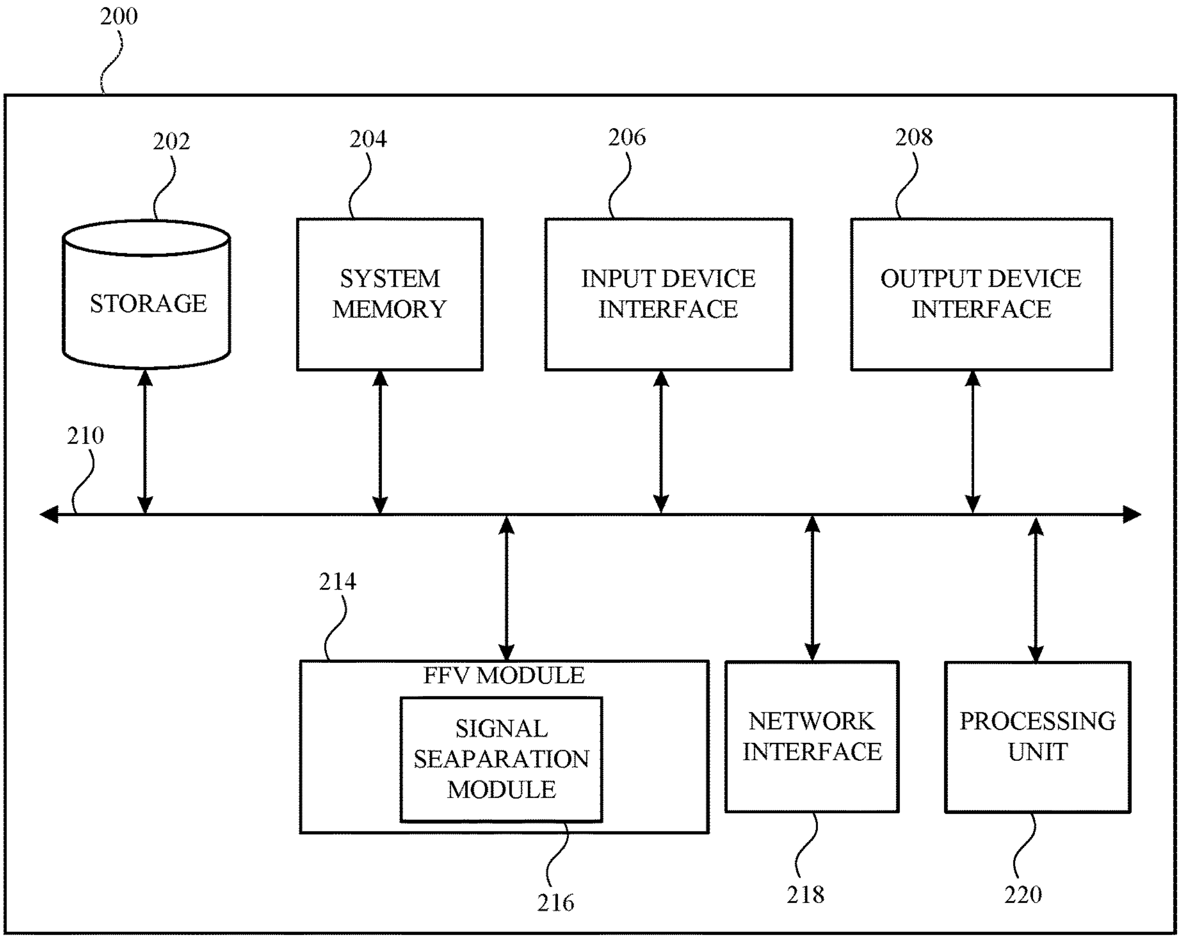
FIG. 2 illustrates an exemplary voice control device, in accordance with one or more exemplary implementations.

FIG. 2 illustrates an exemplary voice control device, in accordance with one or more exemplary implementations. The computing system 200 may be, and/or may be a part of, the voice control device 102, as shown in FIG. 1. The computing system 200 may include various types of computer-readable media and interfaces for various other types of computer-readable media. The computing system 200 includes a bus 210, a processing unit 220, a storage device 202, a system memory 204, an input device interface 206, an output device interface 208, an FFV module 214, a signal separation module 216, and/or a network interface 218.

The bus 210 collectively represents all system, peripheral, and chipset buses that communicatively connect the numerous internal devices of the computing system 200. In one or more implementations, the bus 210 communicatively connects the processing unit 220 with the other components of the computing system 200. From various memory units, the processing unit 220 retrieves instructions to execute and data to process in order to execute the operations of the subject disclosure. The processing unit 220 may be a controller and/or a single- or multi-core processor or processors in various implementations.

The bus 210 also connects to the input device interface 206 and output device interface 208. The input device interface 206 enables the system to receive inputs. For example, the input device interface 206 allows a user to communicate information and select commands on the system 200. The input device interface 206 may be used with input devices such as keyboards, mice, and other user input devices, as well as microphones (e.g., microphone arrays), cameras, and other sensor devices. The output device interface 208 may enable, for example, a playback of audio generated by computing system 200. The output device interface 208 may be used with output devices such as speakers, displays, or any other device for outputting information. One or more implementations may include devices that function as both input and output devices, such as a touchscreen.

The bus 210 also couples the system 200 to one or more networks and/or to one or more network nodes through the network interface 218. The network interface 218 may include one or more interfaces that allow the system 200 to be a part of a network of computers (such as a local area network (LAN), a wide area network (WAN), or a network of networks (the "Internet")). Any or all components of the system 200 may be used in conjunction with the subject disclosure.

The FFV module 214 may be hardware (e.g., processor, controller, integrated circuit, etc.) and/or software configured to process voice data, including far-field voice data. The FFV module 214 may perform one or more operations (e.g., computer-readable instructions) that include accessing audio input captured from a microphone array (e.g., the input device interface 206) and separating and/or enhancing the audio from target sources (e.g., the user 108) for applications, such as ASR, which can use remote (e.g., cloud) voice services and/or local (e.g., on-the-edge) voice services.

The signal separation module 216 may be hardware (e.g., processor, controller, integrated circuit, etc.) and/or software associated with the FFV module 214 and configured to perform signal separation algorithms. Signal separation algorithms include those in BF and/or BSS categories, but other algorithms for separating sources from an audio stream may be utilized. The signal separation module 216 may utilize multiple signal separation algorithms and be configured to dynamically transition between signal separation algorithms based on at least operating environment characteristics obtained from analysis of the audio output. Dynamic transitioning may include a smoothening process to reduce or eliminate the introduction of glitches, noise, or other artifacts that may occur during dynamic transitioning.

The storage device 202 may be a read-and-write memory device. The storage device 202 may be a non-volatile memory unit that stores instructions and data (e.g., static and dynamic instructions and data) even when the computing system 200 is off. In one or more implementations, a mass-storage device (such as a magnetic or optical disk and its corresponding disk drive) may be used as the storage device 202. In one or more implementations, a removable storage device (such as a floppy disk, flash drive, and its corresponding disk drive) may be used as the storage device 202.

Like the storage device 202, the system memory 204 may be a read-and-write memory device. However, unlike the storage device 202, the system memory 204 may be a volatile read-and-write memory, such as random-access memory. The system memory 204 may store any of the instructions and data that one or more processing unit 220 may need at runtime to perform operations. In one or more implementations, the processes of the subject disclosure are stored in the system memory 204 and/or the storage device 202. From these various memory units, the one or more processing unit 220 retrieves instructions to execute and data to process in order to execute the processes of one or more implementations.

Implementations within the scope of the present disclosure may be partially or entirely realized using a tangible computer-readable storage medium (or multiple tangible computer-readable storage media of one or more types) encoding one or more instructions. The tangible computer-readable storage medium also may be non-transitory in nature.

The computer-readable storage medium may be any storage medium that may be read, written, or otherwise accessed by a general purpose or special purpose computing device, including any processing electronics and/or processing circuitry capable of executing instructions. For example, without limitation, the computer-readable medium may include any volatile semiconductor memory (e.g., the system memory 204), such as RAM, DRAM, SRAM, T-RAM, Z-RAM, and TTRAM. The computer-readable medium also may include any non-volatile semiconductor memory (e.g., the storage device 202), such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium may include any non-semiconductor memory, such as optical disk storage, magnetic disk storage, magnetic tape, other magnetic storage devices, or any other medium capable of storing one or more instructions. In one or more implementations, the tangible computer-readable storage medium may be directly coupled to a computing device, while in other implementations, the tangible computer-readable storage medium may be indirectly coupled to a computing device, e.g., via one or more wired connections, one or more wireless connections, or any combination thereof.

Instructions may be directly executable or may be used to develop executable instructions. For example, instructions may be realized as executable or non-executable machine code or as instructions in a high-level language that may be compiled to produce executable or non-executable machine code. Further, instructions also may be realized as or may include data. Computer-executable instructions also may be organized in any format, including routines, subroutines, programs, data structures, objects, modules, applications, applets, functions, etc. As recognized by those of skill in the art, details including, but not limited to, the number, structure, sequence, and organization of instructions may vary significantly without varying the underlying logic, function, processing, and output.

While the above discussion primarily refers to microprocessors or multi-core processors that execute software, one or more implementations are performed by one or more integrated circuits, such as ASICs or FPGAs. In one or more implementations, such integrated circuits execute instructions that are stored on the circuit itself.

Figure 3:
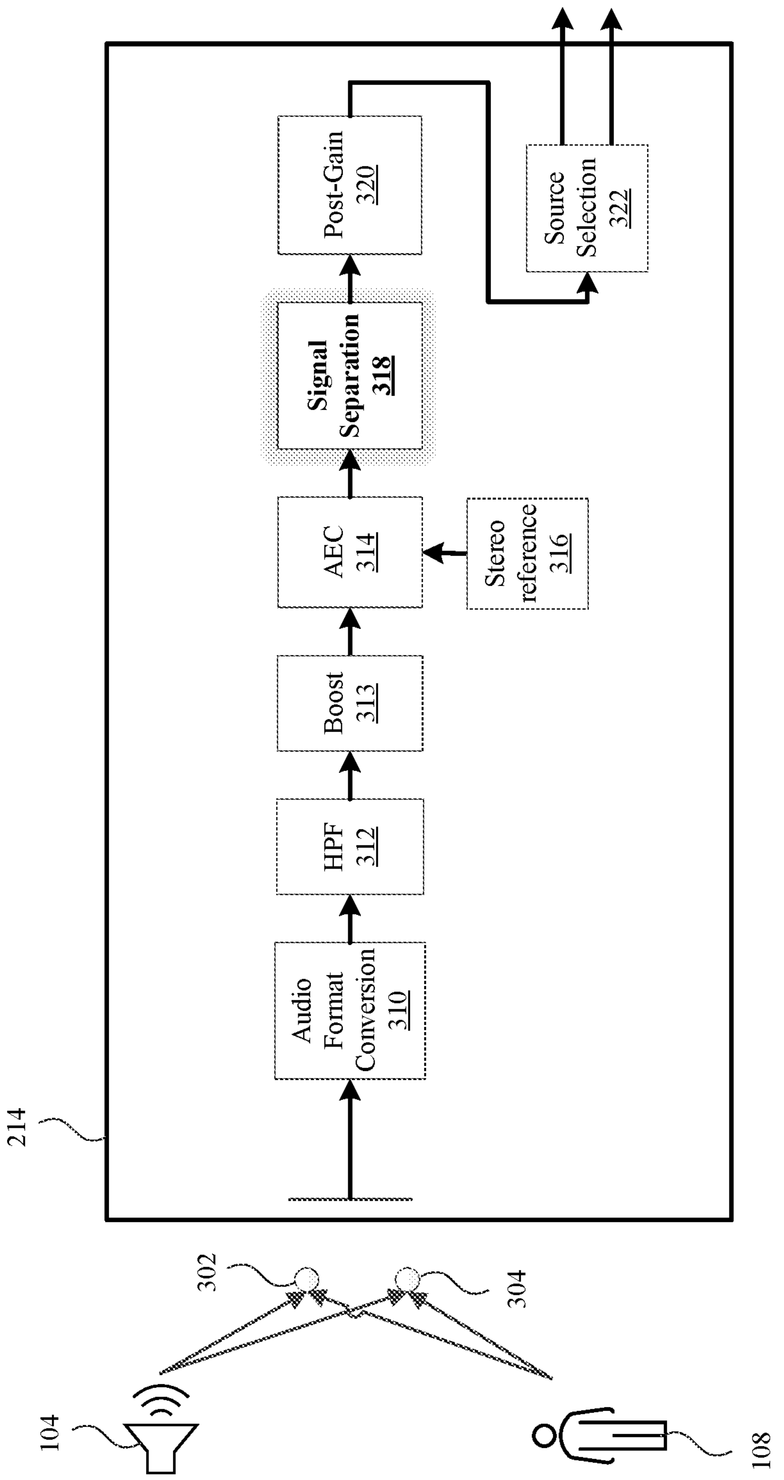
FIG. 3 illustrates a schematic diagram of an FFV module, in accordance with one or more exemplary implementations.

FIG. 3 illustrates a schematic diagram of an FFV module 214, in accordance with one or more exemplary implementations. The voice control device (e.g., voice control device 102) may include one or more integrated and/or discrete microphones (e.g., a two-microphone array with microphones 302, 304) for receiving audio from the user 108 and/or the environment 104. The microphones 302, 304 may be included as part of the voice control device and/or the FFV module 214. The microphones may output digital or analog signals. If analog signals are output, the analog signals may be converted to digital at the audio format conversion module 310.

The FFV modules 214 may receive the audio data from the microphones 302, 304. In one or more implementations, the audio data may be passed to an audio format conversion module 310 in which the audio may be converted to a particular format for the FFV processing pipeline of the FFV module 214. For example, the FFV processing pipeline may be more efficient when the received audio data is in the same format, such as 24-bit 16 kHz. In one or more implementations, a high pass filter (HPF) 312 may be applied to the audio data to cut audio frequencies below a threshold level (e.g., 100 Hz) and reduce DC offset. In one or more implementations, the audio data may be scaled 313 (e.g., boosted) to a level to improve the performance of subsequent blocks in the pipeline. In one or more implementations, acoustic echo cancelation (AEC) 314 may be performed on the audio data. AEC 314 may also include determining an echo strength, which may include a measure of how strong the feedback is from the audio played by the voice control device (e.g., echo return loss (ERL)). Voice control devices may include a speaker (e.g., a TV connected to the voice control device) for outputting audio (e.g., media audio or voice assistive audio) from the voice control device. Because the voice control device knows the reference 316 played from the speaker, the voice control device can remove the reference 316, which can be mono audio or multi-channel audio, from the audio data. It should be understood that, although FIG. 3 depicts reference 316 as stereo, stereo is merely an example of a type of reference

316 and reference 316 may also or instead be mono audio or any multi-channel audio (e.g., 5.1 audio).

Signal separation module 318 separates the audio data into one or more source signals without (or with little) information about the source signals or the mixing process of the source signals, where a source may represent who or what generated the source signal. The subject technology is directed to the processes of the signal separation module 318, which is described in further detail with respect to the subsequent figures.

In one or more implementations, a post-gain 320 of the audio data is adjusted. For example, a volume of the audio data may be increased. In one or more implementations, a source selection 322 may select the correct separate audio data containing the target source audio signal. Signal separation may have some ambiguity as to which source is relevant for a particular application. Accordingly, the selection may be based on an end application (e.g., ASR, voice calling, video calling, etc.) that may receive the audio.

Figure 4:
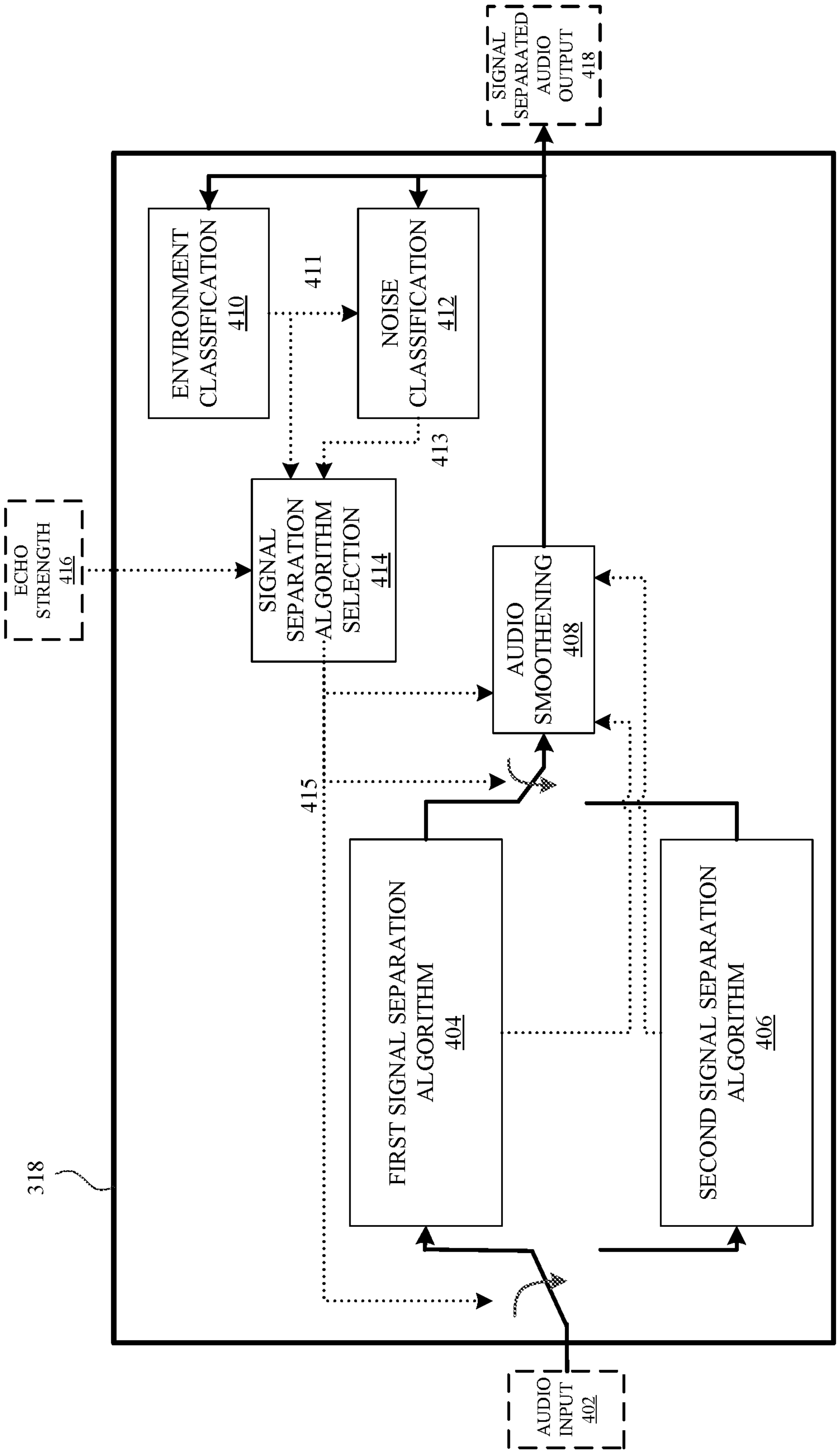
FIG. 4 illustrates a schematic diagram of a signal separation module, in accordance with one or more exemplary implementations.

FIG. 4 illustrates a schematic diagram of a signal separation module 318, in accordance with one or more exemplary implementations. The signal separation module 318 performs one or more signal separation algorithms, such as algorithms in the BF and/or BSS categories. The BF approach aims to separate signals from different sources by generating a spatially directional beam to pass the signal from a target direction and suppress the signals from other directions. The BSS approach aims at separating signals using prominence, Gaussianness, and/or statistical independence of different extracted separated signals and/or input audio and computes a demixing matrix to extract separate signals from the mixture of signals captured by a microphone (e.g., a microphone array).

For a target voice in a relatively silent environment (e.g., a single target source with no interfering sources), BF is an easier solution and generally performs better than BSS. By contrast, for target voices in noisy environments (e.g., single target source along with interfering sources), BSS generally outperforms BF. BSS also has a problem of output stream permutation (e.g., output stream to source signal mapping can change dynamically), which tends to be more pronounced in the silent environment scenarios. The signal separation module 318 obtains the best performance in silent as well as noisy environments with reduced usage computation resources by dynamically selecting the appropriate signal separation approach (e.g., BF and BSS).

On an initial run, the signal separation module 318 receives an audio input 402 (e.g., mixed-signal audio). The audio input 402 may be received as input to either a first signal separation algorithm 404 (e.g., BF) or a second signal separation algorithm 406 (e.g., BSS). The first and second signal separation algorithms may be different from each other. The first and second signal separation algorithms may be different categories of algorithms. For example, the first signal separation algorithm may be a BF algorithm and the second signal separation algorithm may be a BSS algorithm. Additionally or alternatively, the first and second signal separation algorithms may be different algorithms within the same category. For example, the first signal separation algorithm may be an infomax BSS algorithm and the second signal separation algorithm may be a FastICA BSS algorithm. The first signal separation algorithm 404 or the second signal separation algorithm 406 may be set as a default signal separation algorithm, meaning the default signal separation algorithm is assumed to be optimal before the signal separation module 318 begins determining the optimal signal separation module 318. The signal-separated audio 418 may be output from the signal separation module 318. In one or more implementations, additional signal separation algorithms are contemplated. For example, a third category of signal separation algorithms may be utilized (e.g., a hybrid BF and BSS algorithm) and/or a third signal separation algorithm (e.g., a BF algorithm).

The signal-separated audio 418 may also be evaluated by one or more parameters, including noise level, as a non-limiting example. In this regard, the signal-separated audio 418 may be passed to an environment classification module 410. At the environment classification module 410, the audio is analyzed to classify the noise level in the environment (e.g., environment 104) and set an environment type flag 411 accordingly. The classification of the noise level may be performed by a machine learning model, statistical model, and the like, configured to determine whether the environment is silent or noisy relative to a training data set of audio data labeled as noisy or silent, a training data set of audio data classified based on a threshold noise level, and/or previous classifications of previous audio data.

If the environment is relatively noisy (e.g., as indicated by the environment type flag 411), the signal-separated audio 418 may also be passed to a noise classification module 412. At the noise classification module 412, the audio is analyzed to classify the noise in the environment. For example, the noise may be classified as transient or stationary. The noise may also be classified into different types like music, babble, pink/white/brown, and the like. The classification of the noise type may be performed by a machine learning model, statistical model, and the like, which determines whether the environment's noise is relatively transient or stationary.

The signal separation algorithm is determined at the signal separation algorithm selection module 414. The signal separation algorithm selection module 414 is configured to determine which signal separation algorithm (e.g., BF or BSS) is likely to perform better in the current operating scenario. The signal separation algorithm selection module 414 may select a signal separation algorithm as a function of the environment type flag 411, the noise type flag 413, an echo strength 416, and/or a signal-to-noise ratio. The echo strength 416 may be obtained from an acoustic echo cancelation process (e.g., from the AEC module 314). The signal-to-noise ratio may be determined by the signal separation algorithm selection module 414 based on the level of a desired signal (e.g., user voice) to the level of background noise. A signal separation algorithm flag 415 is set according to the selected signal separation algorithm.

In an example implementation, the audio input 402 is routed to the first signal separation algorithm 404 (e.g., BF) or the second signal separation algorithm 406 (e.g., BSS), one of which may be designated as a default, or initial, signal separation algorithm. The output from the default signal separation algorithm may be transmitted (e.g., via one or more modules) to the signal separation algorithm selection module 414 to determine whether predefined parameters (e.g., a noise level, a noise classification, echo strength, and/or a signal-to-noise ratio) are satisfied.

For example, in a scenario in which the active signal separation algorithm is the first signal separation algorithm 404, a set of predefined parameters may include an echo strength at or above an echo strength threshold and a noise level below a noise level threshold. The signal separation algorithm selection module 414 may receive inputs including an environment type flag 411 and an echo strength 416 for determining if the set of predefined parameters is satisfied. If the signal separation algorithm selection module 414 determines that the echo strength is below an echo strength threshold and the environment type flag 411 indicates that the environment classification module 410 determined that the noise level from the output of the first signal separation algorithm 404 (selected as the default in this case) is below the noise threshold, then the set of predefined parameters may be satisfied and the signal separation algorithm selection module 414 may output an indication (e.g., signal separation algorithm flag 415) that may cause (e.g., via the processor) the active signal separation algorithm to change to the second signal separation algorithm 406.

If the signal separation algorithm is updated by the signal separation algorithm selection module 414 (e.g., from the first signal separation algorithm 404 to the second signal separation algorithm 406, or vice versa), the transition from signal-separated audio generated by the previous algorithm to the signal-separated audio generated by the newly selected algorithm may be smoothened after re-mapping to reduce audio artifacts as the signal separation algorithms may have independent mapping for source direction (also referred to herein as source angle) to output stream as described in more detail below.

Figure 5:
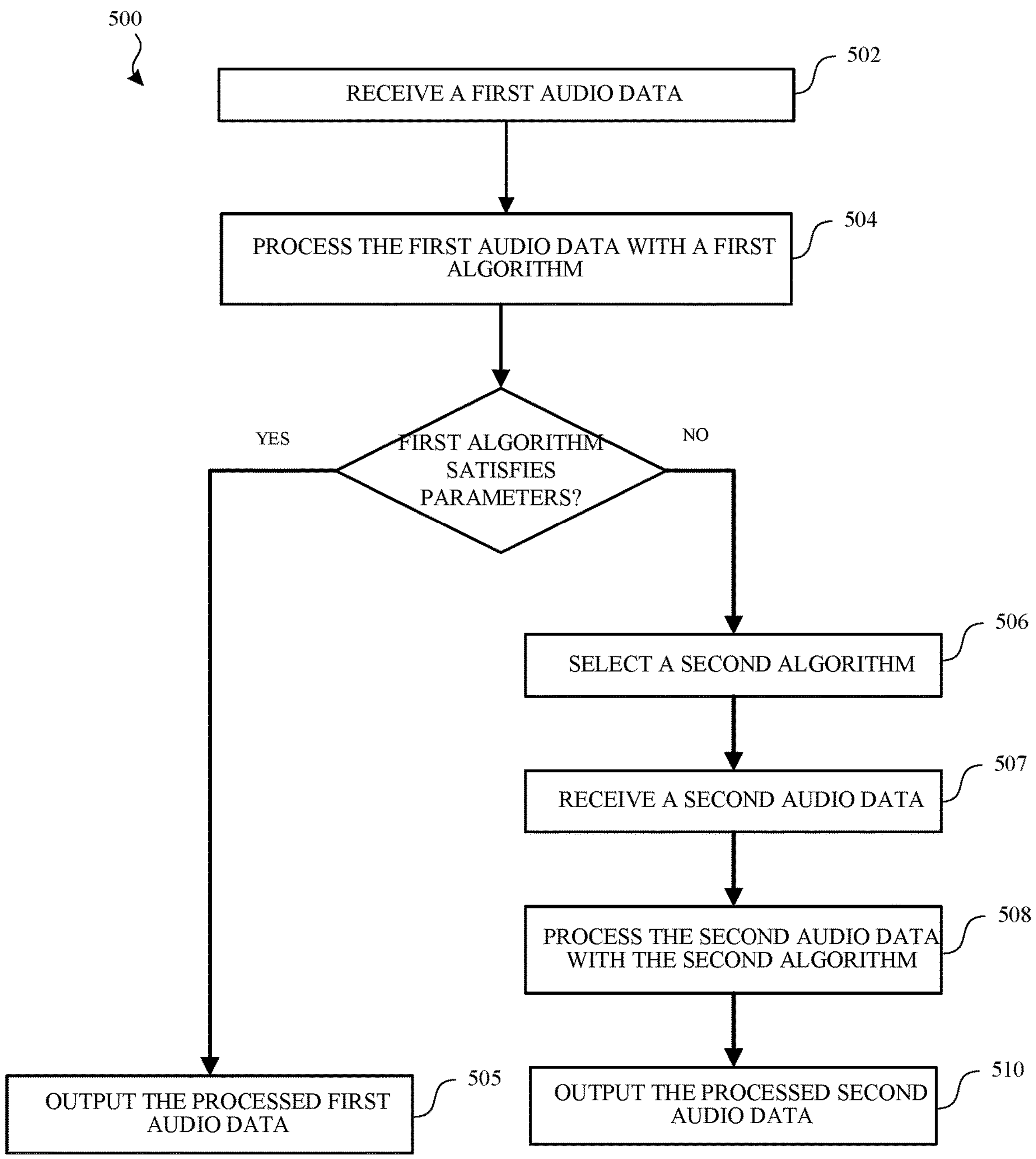
FIG. 5 illustrates a flow diagram of an example process for dynamically selecting a signal separation algorithm, in accordance with one or more exemplary implementations.

FIG. 5 illustrates a flow diagram of an example process 500 for dynamically selecting a far-field signal separation algorithm, in accordance with one or more exemplary implementations. For explanatory purposes, the process 500 is primarily described herein with reference to the previous figures, particularly the signal separation algorithm selection module 414. One or more blocks (or operations) of the process 500 may be performed by one or more other components of other suitable devices. Further, for explanatory purposes, the blocks of the process 500 are described herein as occurring in serial or linearly. However, multiple blocks of the process 500 may occur in parallel. In addition, the blocks of the process 500 need not be performed in the order shown and/or one or more blocks of the process 500 need not be performed and/or can be replaced by other operations.

In the example process 500, at block 502, a signal separation module (e.g., the signal separation module 318) may receive a first audio data. The signal separation module may be included in a computing system (e.g., the computing system 200) of a voice control device (e.g., voice control device 102). The computing system may include one or more microphones (e.g., the input device interface 206) configured to receive audio data from one or more audio sources (e.g., a user 108 and environment 104). The audio data may be continuously captured by the one or more microphones. References herein to a "first audio data," "second audio data," and so on, may refer to audio data captured over a first period, second period, and so on. The audio data may be passed to an FFV module (e.g., FFV module 214) of the computing system for FFV processing, which includes signal separation at the signal separation module.

At block 504, the signal separation module may process the first audio data with a first signal separation algorithm. The first audio data (e.g., mixed-signal audio data stream) may be received as input to either a BF or BSS algorithm, which may output the first audio data as signal-separated audio. The signal separation algorithms are not limited to BF and BSS, nor is the signal separation module limited to two signal separation algorithms. One of the signal separation algorithms may be set as a default algorithm.

The signal separation module may select a signal separation algorithm based on whether the signal-separated audio from block 504 satisfies at least one parameter. The signal separation module dynamically updates to the optimal signal separation algorithm for the operating scenario of the voice control device. A signal separation algorithm may be considered optimal if audio output from the signal separation module satisfies at least one parameter. Parameters may include noise level and noise type, further described below; however, other parameters are contemplated.

For example, to select the optimal signal separation algorithm, the signal-separated audio data from block 504 may first be passed to an environment classification module (e.g., the environment classification module 410) configured to determine a noise level of the signal-separated audio data. If the environment is relatively noisy (e.g., as indicated by the environment type flag), the signal-separated audio may also be passed to a noise classification module (e.g., the noise classification module 412) configured to determine the type of noise in the signal-separated audio data.

The optimal signal separation algorithm is determined at the signal separation algorithm selection module (e.g., the signal separation algorithm selection module 414). The signal separation algorithm selection module is configured to determine which signal separation algorithm (e.g., BF or BSS) is likely to perform better in the current operating scenario and set a signal separation algorithm flag (e.g., the signal separation algorithm flag 415) according to the optimal signal separation algorithm. The signal separation algorithm selection module may select a signal separation algorithm as a function of the environment type flag (e.g., silent or noisy), the noise type flag (e.g., stationary or transient), an echo strength, and/or a signal-to-noise ratio. The parameters and how the optimal signal separation algorithm is chosen are discussed in further detail below with respect to FIG. 6.

If the first audio processed by the first signal separation algorithm is optimal, the processed first audio may be output from the signal separation module 318 at block 505. Otherwise, an optimal signal selection algorithm (e.g., second signal separation algorithm) may be selected at block 506.

At block 507, the signal separation module (e.g., the signal separation module 318) may receive a second audio data. The second audio data may be the audio data received subsequent to the first audio data.

At block 508, the signal separation module may process the second audio data with the optimal signal separation algorithm if the signal separation algorithm has changed at block 506. The audio data (e.g., mixed-signal audio data stream) may be received as input to a signal separation module different from the first signal separation algorithm and output as signal-separated audio.

In one or more implementations, while the signal separation module processes the audio data with the signal separation, the signal separation module may transition from the currently used signal separation algorithm to the optimal signal separation algorithm from block 506. In transitioning, artifacts may be introduced into the audio because there is generally no standard mapping from sources to output channels between signal separation algorithms. For example, source A may be mapped to output channel 1 and source B may be mapped to output channel 2 in a BF algorithm, which may not be the case with a BSS algorithm that may map source A to output channel 2 and source B to output channel 1. The mismatch may result in artifacts that may disrupt the audio data, which may also affect downstream processing and user experience. To reduce the potential for undesired artifacts in the output audio while changing the signal selection algorithm, an audio smoothening module (e.g., the audio smoothening module 408) uses the audio source direction to channel map information from the previous signal separation algorithm and the updated signal separation algorithm to reduce mismatching in source to output channel mapping, the details of which are discussed in detail below with respect to FIG. 7.

At block 510, the signal-separated audio data may be output. The signal-separated audio data may also be sent to the environment classification module and noise classification module for continuous updating of the signal separation algorithm at block 504.

Figure 6:
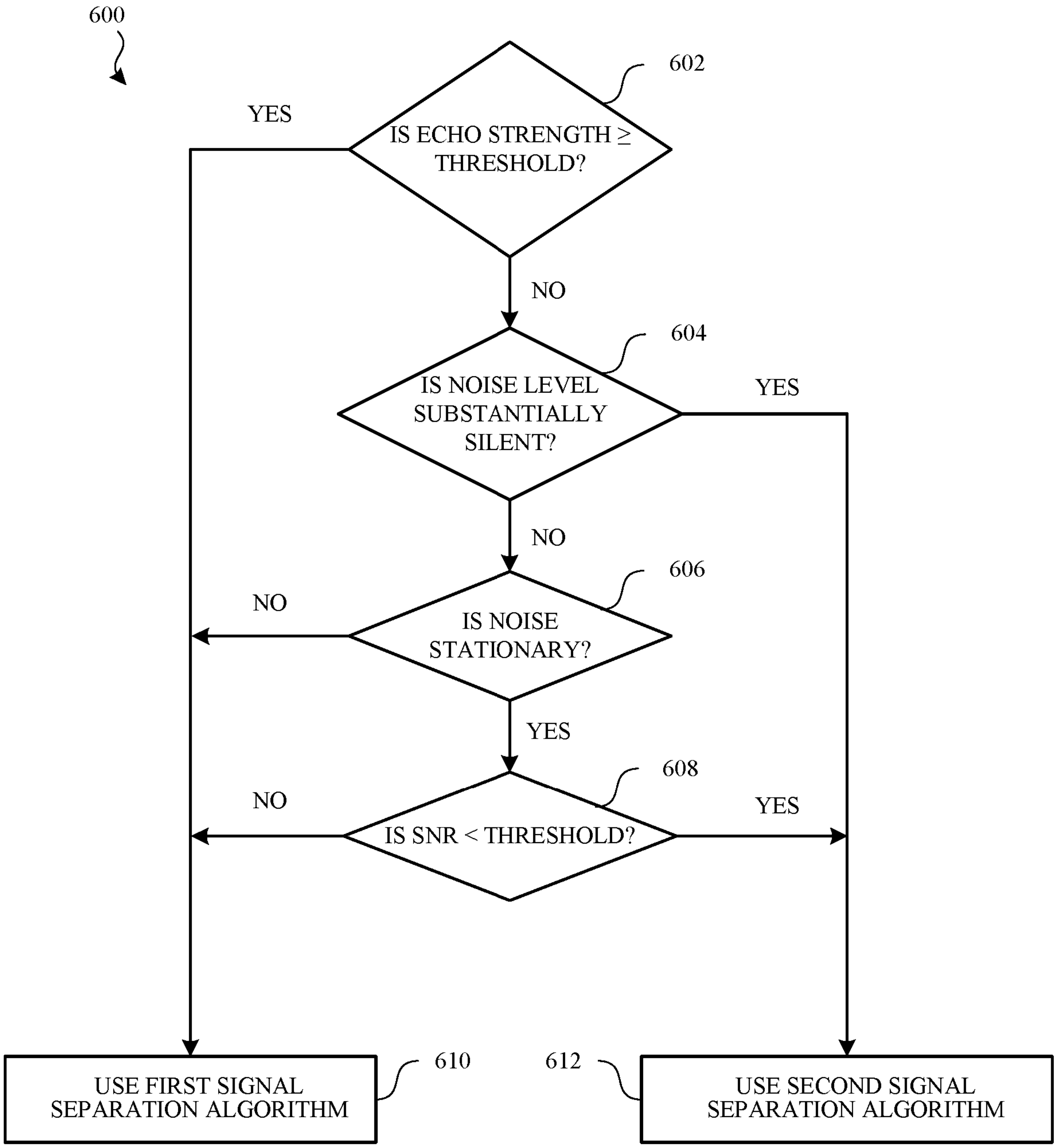
FIG. 6 illustrates a flow diagram of an example process for updating the signal separation algorithm, in accordance with one or more exemplary implementations.

FIG. 6 illustrates a flow diagram of an example process 600 for updating the far-field signal separation algorithm, in accordance with one or more exemplary implementations. For explanatory purposes, the process 600 is primarily described herein with reference to the previous figures, particularly the signal separation algorithm selection module 414. One or more blocks (or operations) of the process 600 may be performed by one or more other components of other suitable devices. Further, for explanatory purposes, the blocks of the process 600 are described herein as occurring in serial or linearly. However, multiple blocks of the process 600 may occur in parallel. In addition, the blocks of the process 600 need not be performed in the order shown and/or one or more blocks of the process 600 need not be performed and/or can be replaced by other operations.

The signal separation algorithm selection module (e.g., the signal separation algorithm selection module 414) may choose a signal separation algorithm from a set of signal separation algorithms. One or more of the signal separation algorithms may be associated with one or more predefined parameters that indicate the circumstances in which the respective signal separation algorithm may be most optimal. The process 600 illustrates three sets of parameters that would indicate that the first signal separation algorithm is optimal and two sets of parameters that would indicate that the second signal separation algorithm is optimal.

In the process 600, at block 602, the signal separation algorithm selection module may receive an indication of echo strength (e.g., echo strength 416). Echo strength is a measure of the amount of audio feedback due to audio playback on the voice control device. Echo strength may be obtained from the AEC module (e.g., AEC module 314). The echo strength may be compared to a threshold level of echo strength. The threshold level of echo strength may be a predetermined or dynamic amount. For example, the threshold level may be based on a loudness of the stereo reference (e.g., stereo reference 316) of the voice control device. If the echo strength is at or above the threshold level, a BSS algorithm may be used at block 610. Otherwise, the process 600 may continue to block 604. In one or more implementations, the process 600 may begin at block 604.

At block 604, the environment classification module may analyze the signal-separated audio to classify the noise level in the environment (e.g., environment 104) and set an environment type flag (e.g., environment type flag 411) accordingly. For example, the noise level may be classified as silent or noisy. The classification of the noise level may be performed by a machine learning model, statistical model, and the like, which determine the likelihood of whether the environment is relatively silent or noisy. The relativity may be between the sources of the signal-separated audio data, between the current signal-separated audio data and previous signal-separated audio data, and/or a noise threshold (e.g., predetermined or dynamic). For example, a cluster analysis may be performed on the environment source of audio data along with historical audio data (e.g., from a buffer that stores audio over a period of time) to determine whether the source is silent (e.g., below a threshold) or noisy (e.g., above a threshold). If the noise level is classified as silent, a BF algorithm may be used at block 612. Otherwise, the process 600 may continue to block 606.

At block 606, the noise classification module analyzes the audio to classify the noise in the environment and set a noise type flag (e.g., noise type flag 413) according to the noise classification. For example, the noise may be classified as transient (e.g., characterized by high amplitude, short-duration sounds, such as speech) or stationary (e.g., characterized by mostly unchanging audio, such as hums or white noise). The classification of the noise type may be performed by a machine learning model, statistical model, and the like, which determine a likelihood of whether the environment's noise is relatively transient or stationary. The relativity may be between the sources of the signal-separated audio data, between the current signal-separated audio data and previous signal-separated audio data, and/or a noise type threshold (e.g., predetermined or dynamic). For example, a cluster analysis may be performed on the environment source of audio data to determine the probability that the source is transient. If the noise is not classified as stationary, a BFF algorithm may be used at block 610. Otherwise, the process 600 may continue to block 608. In one or more implementations, if the noise is classified as stationary, a BF algorithm may be used at block 612.

At block 608, signal separation algorithm selection module may determine the signal-to-noise ratio (SNR) of the audio data. The SNR is a measure of a desired signal relative to background noise. SNR may be determined by comparing the two levels and returning a ratio indicating whether the noise level impacts the designed signal. For example, the desired signal may be the voice signal, and the noise may be the noise signal from the signal-separated audio data. The SNR may be compared to a threshold level of SNR. The threshold level may be a predetermined or dynamic amount. For example, the threshold level may be based on a loudness of the stereo reference of the voice control device. If the SNR is not below the threshold level, a BF algorithm may be used at block 612. Otherwise, the process 600 may use a BSS algorithm at block 610.

Figure 7:
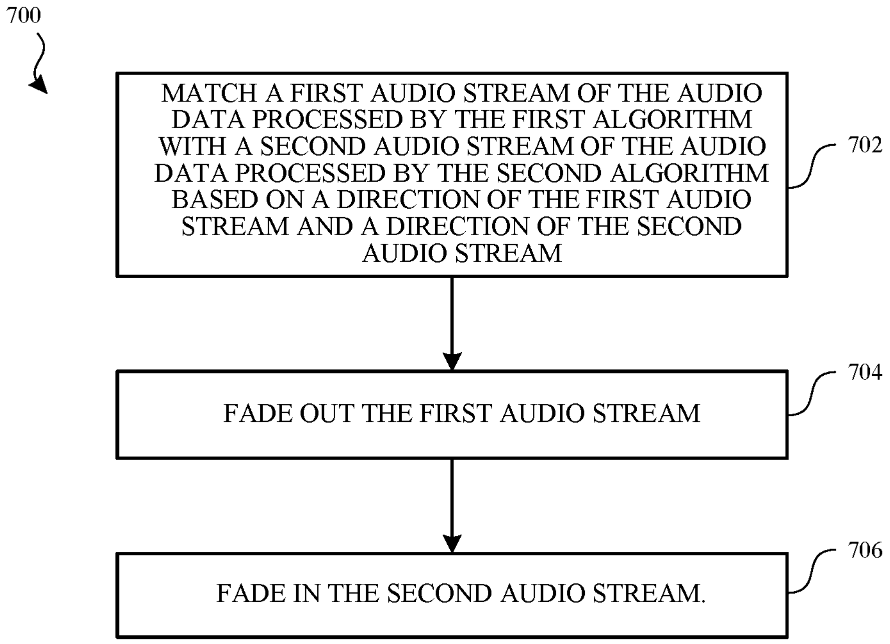
FIG. 7 illustrates a flow diagram of an example process for transitioning between signal separation algorithms, in accordance with one or more exemplary implementations.

FIG. 7 illustrates a flow diagram of an example process 700 for transitioning between far-field signal separation algorithms, in accordance with one or more exemplary implementations. For explanatory purposes, the process 700 is primarily described herein with reference to the previous figures, particularly to the audio smoothening module 408. One or more blocks (or operations) of the process 700 may be performed by one or more other components of other suitable devices. Further, for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

In the process 700, at block 702, the audio smoothening module (e.g., audio smoothening module 408) may match audio streams of the audio data processed by the previous algorithm with audio streams of the audio data processed by the new (e.g., optimal) algorithm. The matching may be based on source directions corresponding to the audio streams. The matching may also be based on other paramers such as correlation between the first and second audio streams.

The audio smoothening module may receive a signal separation algorithm flag (e.g., signal separation algorithm flag 415) indicating whether the signal separation module will change signal separation algorithms. For example, the signal separation module may be using a BF algorithm but changes in the operating conditions of the voice control device may instead warrant using a BSS algorithm, as determined by the signal separation algorithm selection module. To reduce the protentional introduction of artifacts in the audio due to the transitioning of the signal separation algorithms, the transition between the audio data output from one signal separation algorithm and the audio data output from another signal separation algorithm may be smoothened by correcting source to stream mapping mismatches between the audio data outputs from the signal separation algorithms.

When a signal separation algorithm is changed, the audio smoothening module may receive an audio data output from the first signal separation algorithm (e.g., first signal separation algorithm 404) and an audio data output from the second signal separation algorithm (e.g., second signal separation algorithm 406). The first signal separation algorithm may be a BSS algorithm and the second signal separation algorithm may be a BF algorithm. Each signal separation algorithm may receive a mixed-signal audio input and output signal-separated audio data including one or more streams. For example, both BF and BSS algorithms take N audio inputs captured by N microphones in an array and separate audio from different sources into M different output audio streams (where M is generally less than or equal to N). Each audio stream may contain audio from a different source with higher clarity. The audio stream to source mapping may depend on the convergence path that the BF and BSS algorithms take and may change as time progresses. When audio stream to source mapping is inconsistent between BF and BSS algorithm changes, artifacts may be introduced in the output audio data.

The audio smoothening module may generate an angular distance matrix. The angular distance matrix may be a rectangular array where the columns represent the streams from one signal separation algorithm, and the rows represent the streams from another signal separation algorithm. In one or more implementations, only the upper diagonal of the angular distance matrix may be generated to save computational resources. The elements of the matrix may be an angular distance, which is the absolute value of the difference between the angular distances of a stream of one algorithm and a corresponding stream of the other algorithm.

For example, let M=2 and θ=source angle, the source to stream mapping of the previously active signal separation algorithm may be stream 1=$\theta_{O1}$ and stream 2=$\theta_{O2}$ and the source to stream mapping of the new signal separation algorithm may be stream 1=$\theta_{N1}$ and stream 2=$\theta_{N2}$. The upper diagonal M×M angular distance matrix is:

$$\begin{bmatrix} |\theta_{O1} - \theta_{N1} & |\theta_{O1} - \theta_{N2}| \\ & |\theta_{O2} - \theta_{N2}| \end{bmatrix}$$

The upper diagonal M×M angular distance matrix may be represented as a set of sets $\{\{|\theta_{O1}-\theta_{N1}|, |\theta_{O1}-\theta_{N2}|\}, \{|\theta_{O2}-\theta_{N2}|\}\}$.

The angular distances of the angular distance matrix are updated to distinguish between streams from the previous algorithm that matches the new algorithm and streams from the previous algorithm that does not match the new algorithm. The output streams from the previous and new algorithms are matched based on their angular distance (e.g., the difference between their associated source angle). Streams between both algorithms with matched source angles are stitched to avoid audio artifacts. Streams from unmatched source directions are stitched with the remaining streams from the previous algorithm at random as these are treated as new sources, which may occur due to changes in operating conditions (e.g., the previous condition had one voice, but the new condition has two voices).

To update the matrix, each angular distance in the matrix above an angular distance threshold is set to infinity. Even if both algorithms are mapping the same source in the same stream, their angles may not match exactly. Accordingly, an angular distance threshold may be set to a level of tolerance such that streams may be accurately mapped together between algorithms despite the slight distance between each stream's corresponding angular distance. For example, if a first stream of a BF algorithm estimates a first source to be at 45 degrees and a second stream of a BSS algorithm estimates the first source to be at 48 degrees, the streams may be mapped together if the threshold is 3; however, a first stream of the BSS algorithm estimates the first source to be at 58 degrees, the element of the matrix corresponding to the streams may be set to infinity because their distance |58−45| is greater than 3.

$$\begin{bmatrix} |45 - 48| & |45 - 48| \\ & |\theta_{O2} - \theta_{N2}| \end{bmatrix} \rightarrow \begin{bmatrix} \infty & 3 \\ & |\theta_{O2} - \theta_{N2}| \end{bmatrix}$$

The angular distance matrix may be sorted. For example, the values of the angular distance matrix may be sorted in increasing order.

$$\begin{bmatrix} \infty & 3 \\ & |\theta_{O2} - \theta_{N2}| \end{bmatrix} \rightarrow \begin{bmatrix} 3 & \infty \\ & |\theta_{O2} - \theta_{N2}| \end{bmatrix}$$

From the sorted matrix, a set of distances can be derived for the previous algorithm and/or the new algorithm. For example, the set of distances of the BF algorithm may be $\{3, \infty\}$ and $\{|\theta_{O2}-\theta_{N2}|\}$. As another example, the set of distances of the BSS algorithm may be $\{|\theta_{O2}-\theta_{N2}|, \infty\}$ and $\{3\}$. In one or more implementations, the set of distances may instead be derived and then sorted.

Using the set of distances derived from the matrix for the previous algorithm, the minimum distance can be identified for each stream of the previous algorithm. For example, if the set of distances of the BF algorithm is $\{3, \infty\}$ for the first stream and $\{|\theta_{O2}-\theta_{N2}|\}$ for the second stream, the minimum distance for the first stream may be 3 and the minimum distance for the second stream may be $|\theta_{O2}-\theta_{N2}|$. The smoothening module may iterate through the sets of angular distances for each stream of the previous or new algorithm.

The streams from the previous signal separation algorithm may be mapped to the streams of the new signal separation algorithm. For a particular set of angular distances corresponding to a stream of the previous signal separation algorithm, the minimum angular distance (e.g., the angular distance having the smallest value) may be identified. The minimum angular distance may be associated with two streams (e.g., the streams from which the minimum angular distance is derived). In the case of a tie, the tie may be broken at random. The two streams may then be mapped together.

The streams that are mapped together may be removed from the matrix. That is, angular distance values associated with the two streams may be removed from the matrix so they may no longer be mapped to another source. After the angular distance values have been removed from the matrix, the smoothening module proceeds to determine whether another set of angular distances is associated with another stream of the previous signal separation algorithm. The smoothening module continues to map the streams of the previous signal separation algorithm to the streams of the new signal separation algorithm until all of the streams of the previous signal separation algorithm are mapped. The result is a 1-to-1 mapping if the matrix is an M×M matrix.

Once the streams of the previous signal separation algorithm are mapped, the mapped streams may then be stitched by fading out (e.g., reducing the volume) of the previous signal separation algorithm (e.g., the streams of the previous signal separation algorithm) and fading in (e.g., increasing the volume) of the new signal separation algorithm (e.g., the streams of the new signal separation algorithm) at block 704 and block 706, respectively.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" or "one or more of" preceding a series of items, with the term "and" or "or" to separate any of the items, modifies the list as a whole, rather than each member of the list (i.e., each item). The phrase "at least one of" or "one or more of" does not require the selection of at least one of each item listed; rather, the phrase allows a meaning that includes at least one of any one of the items, and/or at least one of any combination of the items, and/or at least one of each of the items. By way of example, the phrases "at least one [one or more] of A, B, and C" or "at least one [one or more] of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine (e.g., her) and vice versa. Headings and subheadings, if any, are used for convenience only and do not limit the subject disclosure.

What is claimed is:

1. A non-transitory computer-readable medium storing instructions that, when executed by a processor, cause the processor to perform operations comprising:
receiving a first audio data;
processing the first audio data by a first signal separation algorithm;
in response to an output of the first signal separation algorithm satisfying at least one parameter, outputting the processed first audio data; and
in response to the output of the first signal separation algorithm not satisfying the at least one parameter:
selecting a second signal separation algorithm, which is different than the first signal separation algorithm;
receiving a second audio data subsequent in time to receiving the first audio data;
processing the second audio data by the second signal separation algorithm;
during the processing of the second audio data, transitioning from the first signal separation algorithm to the second signal separation algorithm in response to selecting the second signal separation algorithm, wherein transitioning from the first signal separation algorithm to the second signal separation algorithm comprises:
matching a first audio stream of the first audio data with a second audio stream of the second audio data based on a direction of the first audio stream and a direction of the second audio stream;
fading out the first audio stream; and
fading in the second audio stream; and
outputting the processed second audio data.

2. The non-transitory computer-readable medium of claim 1, wherein the at least one parameter includes one or more of an echo strength, a noise level, a noise classification, and a signal-to-noise ratio.

3. The non-transitory computer-readable medium of claim 1, wherein the operations further comprise, in response to an output of the second signal separation algorithm not satisfying the at least one parameter:
selecting a third signal separation algorithm, which is different than the first signal separation algorithm and the second signal separation algorithm and is at least one of a beamforming algorithm or a blind source separation algorithm;
receiving a third audio data;
processing the third audio data with the third signal separation algorithm; and
outputting the processed third audio data.

4. The non-transitory computer-readable medium of claim 1, wherein:
the first signal separation algorithm is a default algorithm.

5. The non-transitory computer-readable medium of claim 1, wherein:
the first audio data and the second audio data include at least voice data.

6. The non-transitory computer-readable medium of claim 1, wherein:
the first signal separation algorithm is at least one of a beamforming algorithm and a blind source separation algorithm; and
the second signal separation algorithm is at least one of a blind source separation algorithm and a beamforming algorithm.

7. A system, comprising:
a controller configured to perform operations comprising:
receiving a first audio data;
processing the first audio data by a first signal separation algorithm;
in response to an output of the first signal separation algorithm satisfying at least one parameter, outputting the processed first audio data; and
in response to the output of the first signal separation algorithm not satisfying the at least one parameter:
selecting a second signal separation algorithm, which is different than the first signal separation algorithm;
receiving a second audio data subsequent in time to receiving the first audio data;
processing the second audio data by the second signal separation algorithm;
during the processing of the second audio data, transitioning from the first signal separation algorithm to the second signal separation algorithm in response to selecting the second signal separation algorithm, wherein the transitioning from the first signal separation algorithm to the second signal separation algorithm comprises:
matching a first audio stream of the first audio data with a second audio stream of the second audio data based on a direction of the first audio stream and a direction of the second audio stream;
fading out the first audio stream; and
fading in the second audio stream; and
outputting the processed second audio data.

8. The system of claim 7, wherein the at least one parameter includes one or more of an echo strength, a noise level, a noise classification, and a signal-to-noise ratio.

9. The system of claim 7, wherein the operations further comprise, in response to an output of the second signal separation algorithm not satisfying the at least one parameter:
selecting a third signal separation algorithm, which is different than the first signal separation algorithm and the second signal separation algorithm and is at least one of a beamforming algorithm or a blind source separation algorithm;
receiving a third audio data;
processing the third audio data with the third signal separation algorithm; and
outputting the processed third audio data.

10. The system of claim 7, wherein:
the first audio data and the second audio data include at least voice data.

11. The system of claim 7, wherein:
the first signal separation algorithm is at least one of a beamforming algorithm and a blind source separation algorithm; and
the second signal separation algorithm is at least one of a blind source separation algorithm and a beamforming algorithm.

12. The system of claim 7, wherein the operations further comprise:
during the processing of the second audio data, transitioning from the first signal separation algorithm to the second signal separation algorithm in response to selecting the second signal separation algorithm.

13. An integrated circuit, comprising:
a logic configured to perform operations comprising:
receiving a first audio data;
processing the first audio data by a first signal separation algorithm;

in response to an output of the first signal separation algorithm satisfying at least one parameter, outputting the processed first audio data; and in response to the output of the first signal separation algorithm not satisfying the at least one parameter:

selecting a second signal separation algorithm, which is different than the first signal separation algorithm;

receiving a second audio data subsequent in time to receiving the first audio data;

processing the second audio data by the second signal separation algorithm;

during the processing of the second audio data, transitioning from the first signal separation algorithm to the second signal separation algorithm in response to selecting the second signal separation algorithm wherein transitioning from the first signal separation algorithm to the second signal separation algorithm comprises:

matching a first audio stream of the first audio data with a second audio stream of the second audio data based on a direction of the first audio stream and a direction of the second audio stream;

fading out the first audio stream; and fading in the second audio stream; and outputting the processed second audio data.

14. The integrated circuit of claim 13, wherein the at least one parameter includes one or more of an echo strength, a noise level, a noise classification, and a signal-to-noise ratio.

15. The integrated circuit of claim 13, wherein the operations further comprise, in response to an output of the second signal separation algorithm not satisfying the at least one parameter:

selecting a third signal separation algorithm, which is different than the first signal separation algorithm and the second signal separation algorithm and is at least one of a beamforming algorithm or a blind source separation algorithm;

receiving a third audio data;

processing the third audio data with the third signal separation algorithm; and outputting the processed third audio data.

16. The integrated circuit of claim 13, wherein:

the first audio data and the second audio data include at least voice data.

17. The integrated circuit of claim 13, wherein:

the first signal separation algorithm is at least one of a beamforming algorithm and a blind source separation algorithm; and the second signal separation algorithm is at least one of a blind source separation algorithm and a beamforming algorithm.

18. The integrated circuit of claim 13, wherein the first signal separation algorithm is a default algorithm.

19. The system of claim 7, wherein:

the first signal separation algorithm is a default algorithm.

20. The non-transitory computer-readable medium of claim 1, wherein matching the first audio stream with the second audio stream comprises generating an angular distance matrix.

* * * * *